United States Patent [19]
Vielberth

[11] Patent Number: 5,343,442
[45] Date of Patent: Aug. 30, 1994

[54] PROCESS AND DEVICE FOR CATCHING FISH

[76] Inventor: Johann Vielberth, Weichser Weg 5, 8400 Regensburg, Fed. Rep. of Germany

[21] Appl. No.: 946,076

[22] Filed: Sep. 18, 1992

[30] Foreign Application Priority Data

Sep. 19, 1991 [DE] Fed. Rep. of Germany ... 9111693[U]
Oct. 12, 1991 [DE] Fed. Rep. of Germany ... 9112715[U]
May 12, 1992 [DE] Fed. Rep. of Germany ....... 4215531

[51] Int. Cl.$^5$ .......................... A01K 69/06; H04B 1/02
[52] U.S. Cl. ................................................. 367/139
[58] Field of Search ................... 367/139; 43/4.5, 17.1, 43/17.5

[56] References Cited

FOREIGN PATENT DOCUMENTS 261981 8/1912 Fed. Rep. of Germany .
2501467 9/1982 France .

*Primary Examiner*—Daniel T. Pihulic
*Attorney, Agent, or Firm*—Hoffman, Wasson & Gitler

[57] ABSTRACT

A process and apparatus for catching fish, provided with a food container having an ingress opening and an egress opening, as well as a catch container having an ingress opening. Each of these openings is provided with a frustum-shaped fish trap element having openings on both ends. During operation, the food container is lowered into a body of water and a signal is generated in the body of water attracting fish to the food container as bait food is dispensed into the food container, for the purpose of training fish to swim therethrough. When it is desired to catch fish, the catch container is lowered into the body of water having an access opening which is aligned with the egress opening of the food container. At this time, the signal is generated and food is dispensed into the food container causing the fish to move from the body of water into the food container and then into the catch container.

27 Claims, 9 Drawing Sheets

PROCESS AND DEVICE FOR CATCHING FISH

BACKGROUND OF THE INVENTION

Field of the Invention

The invention relates to a process as well as to a device for catching fish.

SUMMARY OF THE INVENTION

The process according to the invention and the device according to the invention are suitable especially for general fishing, but also for the specific removal of fish in a fish hatchery, as well as for the specific removal or reduction of certain types of fish in a body of water, which are present in too high a quantity. In this sense, the invention is suitable for stabilizing the body of water, for example, for the specific removal of whitefish from so-called "churned seas" or bodies of water, which is only inadequately possible with the usual prior art techniques, such as, for example, with trawl nets or with the help of electrofishing.

It is therefore an object of the present invention to provide a process, as well as a device, with which it is possible, with a low expenditure of time and labor, to catch fish with high effectiveness from a body of water.

BRIEF DESCRIPTION OF THE DRAWINGS

An embodiment of the invention is explained in more detail below based upon the following figures, in which.

DETAILED DESCRIPTION OF THE INVENTION

Figure 1:
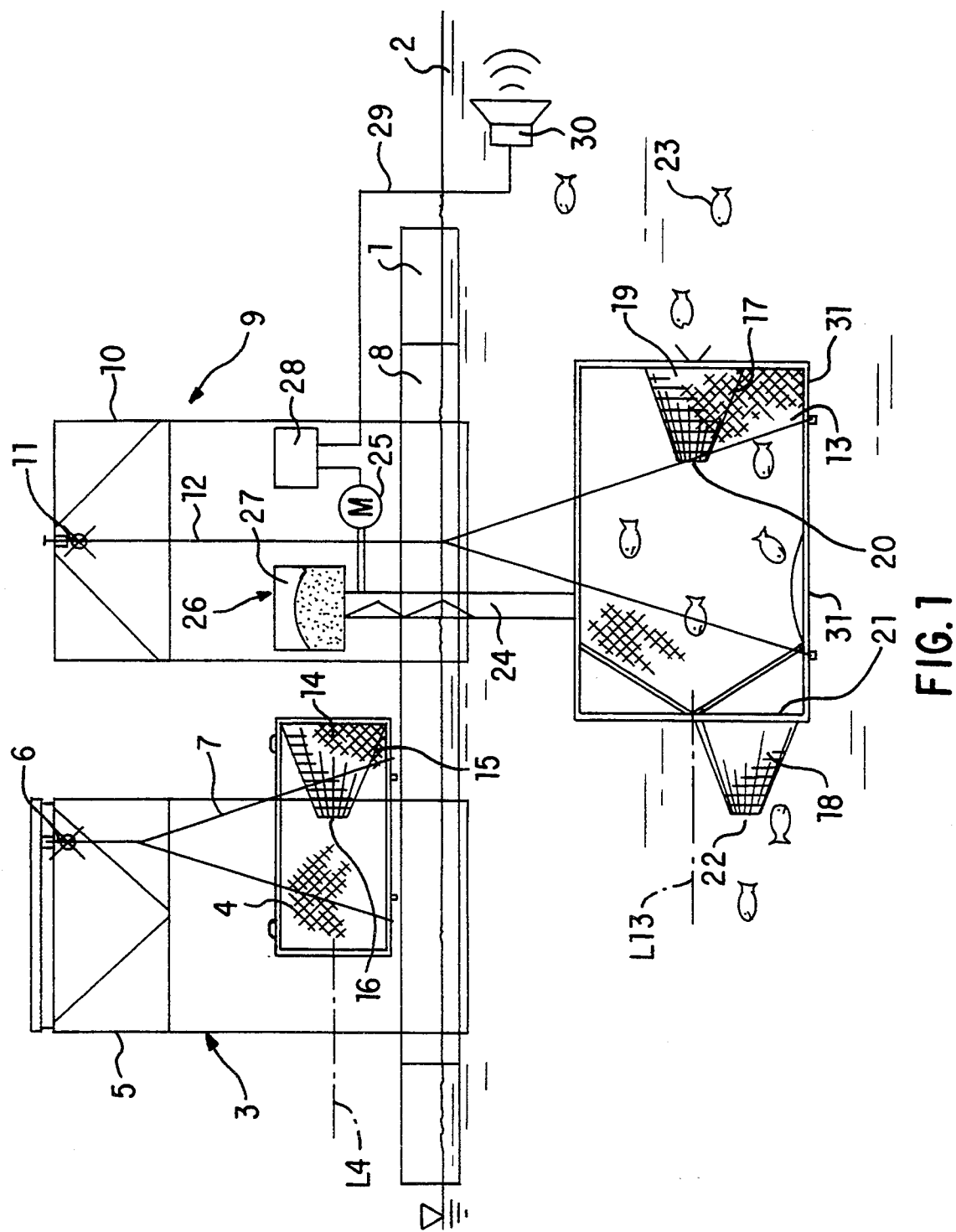
FIG. 1 is a simplified diagrammatic representation of the device, according to the invention, including a food container lowered into the body of water, as well as in a catch container lifted out from the body of water.

FIGS. 1–4 illustrate a platform 1, which is arranged as an element floating in a body of water 2.

A first lifting device 3, with which a catch container 4 can be lowered into the body of water 2 and can be lifted again from the latter, is provided on platform 1. The lifting device 3 consists, for example, of a supporting frame 5 provided on the platform 1, on which a crane carriage 6 with a crane-like hoist 7 is movably provided, specifically so that the lowering and lifting of the catch container 4 can take place on one side of the platform 1 or, in the represented embodiment, in the area of a central recess 8 provided in the platform 1.

A second lifting device 9 is provided on platform 1, which also basically consists of a supporting frame 10 provided on the platform and of a crane carriage 11 with a hoist 12 movable on the supporting frame. The lifting device 9 is used to lower and lift a food container 13, which can be lifted and lowered in the same manner as the catch container 4 in the area of central recess 8.

In the represented embodiment, catch container 4 is a parallelepiped-shaped basket closed on its surfaces or wall areas by a wire grating. An opening 14 is provided on the front side of the catch container 4. A frustum-shaped fish-trap-like element 15, also produced from a wire grating material, lies with its axis coaxial with lengthwise extension L4 of the catch container 4. An opening 16, smaller in cross-section than the opening 14 is provided in the fish-trap element 15. The fish-trap trap element 15 is placed within the catch container 4. In the represented embodiment, the length of the fish trap-like element 15 is smaller, in the direction of axis L4, than half the lengthwise extension of catch container 4 in this axial direction.

As the figures show, the catch container 4 is held on hoist 7 so that it is arranged with its axis L4 approximately in the horizontal direction. Except for the openings 14 and 16 in the fish trap-like element 15, the interior of the catch container 4 is completely closed by the wire grating.

In the represented embodiment, the food container 13 is also designed as a parallelepiped-shaped basket made of wire grating. On its two sides placed perpendicular to the lengthwise extension L13, the food container is respectively provided with a fish trap-like element 17, provided at the right front side in the figures, and with a fish trap-like element 18 is provided at the left front side of the figures. Fish trap-like element 17, which is placed inside food container 13 and lies with its lengthwise extension coaxial with axis L13, forms with its larger opening 19, and opening of the food container on the right front side. The smaller opening 20 of frustum-like element 17 is present at a relatively great distance from the left front side of the food container 13, and inside this container 13. The element 17 is also constructed from a wire grating material.

Fish trap-like element 18, which again is made frustum-shaped and consists of the wire grating, projects over the left front side of food container 13 and has on this front side an opening 21, which is larger than opening 22. These openings 21,22 connect the element 18 to the interior of the food container 13. In the represented embodiment, the element 18 lies with its axis offset and downwardly parallel to the axis L13 relative to element 17. However, it is possible that both fish trap-like elements 17 and 18 are placed coaxially with one another, specifically, either coaxial with the longitudinal axis L13, or offset relative to the latter.

The mesh size of the wire grating used for containers 4 and 13 and fish trap-like elements 15, 17 and 18 is selected so that fish 23 of a desired size can be caught. The interior of the food container 13 is connected by a flexible channel or tube with a feeding device 26 provided with a motor 25 and a storage container 27. Feeding device 26 is also provided together with a control device 28 on the supporting frame 10 of platform 1. The control device 28, which activates the automatic feeding device according to a preprogrammed time control, or turns on the motor 25 for dispensing fish food inside the food container 13, further includes a generator for producing an electric signal which is connected to a signal transmitter 30, such as an underwater loudspeaker, immersed in the body of water 2, by a line 29. The signal transmitter 30 always emits an acoustic signal when the automatic feeding device 26 is also activated. Preferably, the electric signal transmitter 30 is activated for a preset period of time (e.g., a half minute) before turning on the automatic feeding device, and would remain activated during the entire period that food is dispensed.

For collecting unused food, the feeding container 13 can be designed with a closed bottom wall or with another device for collecting this food.

The described device is used to effectively add fish 23 from the body of water 2 at the lowest possible expense. For this purpose, fish 23 are fed in a breeding or training phase, which can be several days or several weeks with the food container 13 being lowered into the body of water 2 and the catch container 4 lifted from the body of water 2. At certain preset time intervals, the dispensing of food would take place into the interior of food container 13, together with the production of the acoustic signal by signal transmitter 30. Fish 23 can swim into the food container 13 through element 17 for receiving food, and can swim out of the food container 13 through element 18. Due to the construction of the elements 17,18, it would be practically impossible to swim into the container 13 through element 18 and exit the container 13 through element 17. Since the dispensing of food is accomplished by the acoustic signal of signal transmitter 30, the fish 23 become trained so that they swim into food container 13 in large numbers when hearing the acoustic signal.

For the purpose of catching fish, the catch container 4 is lowered utilizing the lifting device 3 into the body of water 2, so that both containers 4 and 13 are directly adjacent to one another with element 18 engaging element 15. Fish 23 swimming into the food container 13 leave the latter in the customary way through element 18. However, since element 18 is in line with element 14, as shown in FIG. 2, the fish will swim into the catch container 4.

Figure 3:
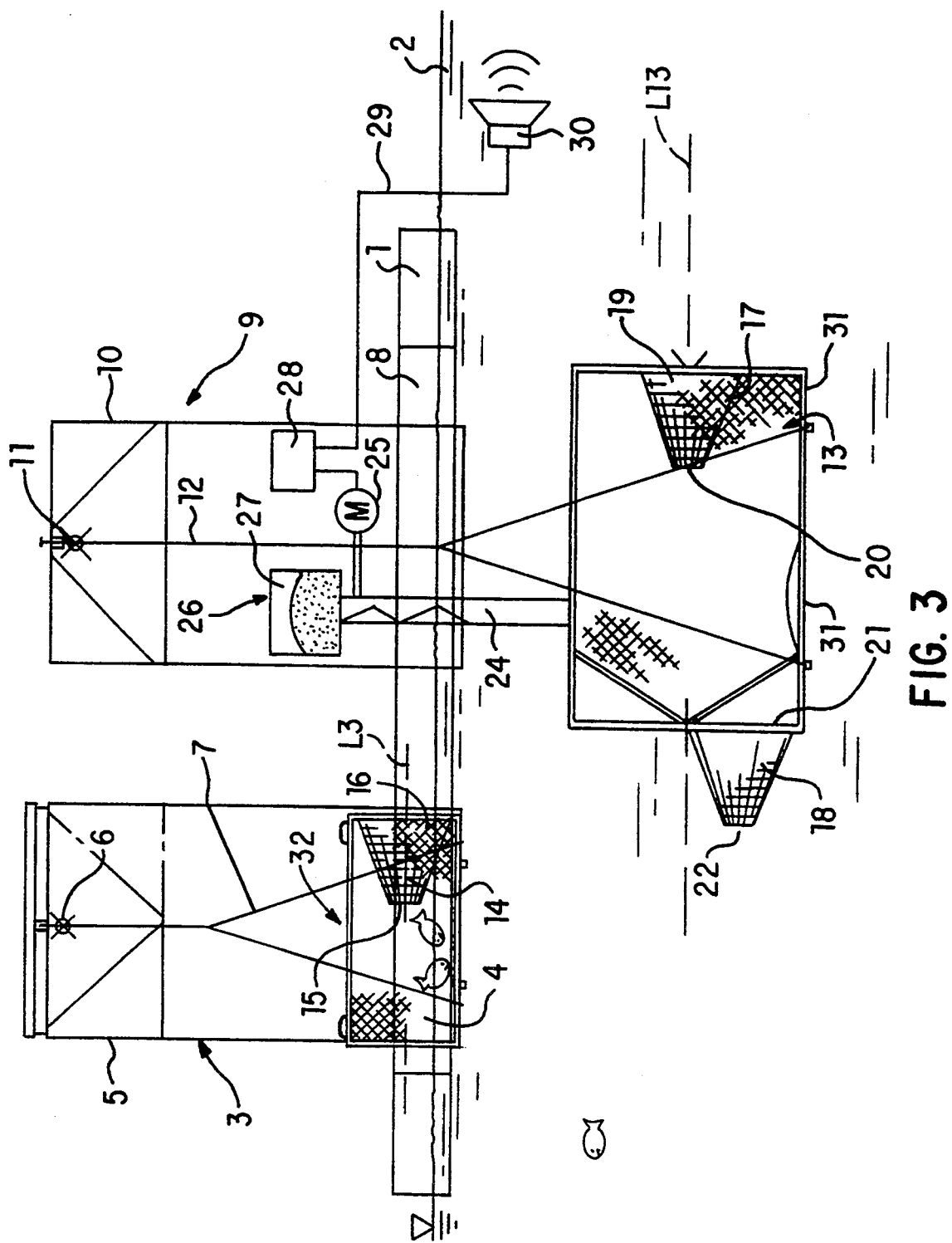
FIG. 3 is a represenatation similar to FIG. 1, in which the catch container is partially contained in the water.

For the removal as well as the sorting out by fish type and/or size, the catch container 4 is raised with the help of lifting device 3 into the position represented in FIG. 3, in which the bottom portion of the catch container 4 is immersed in the body of water 2, and the top portion of the catch container 4 projects a sufficient distance out of the body of water 2. The top portion of the catch container 4 is preferably provided with a flap 32, which can be opened to remove the fish 23.

Figure 2:
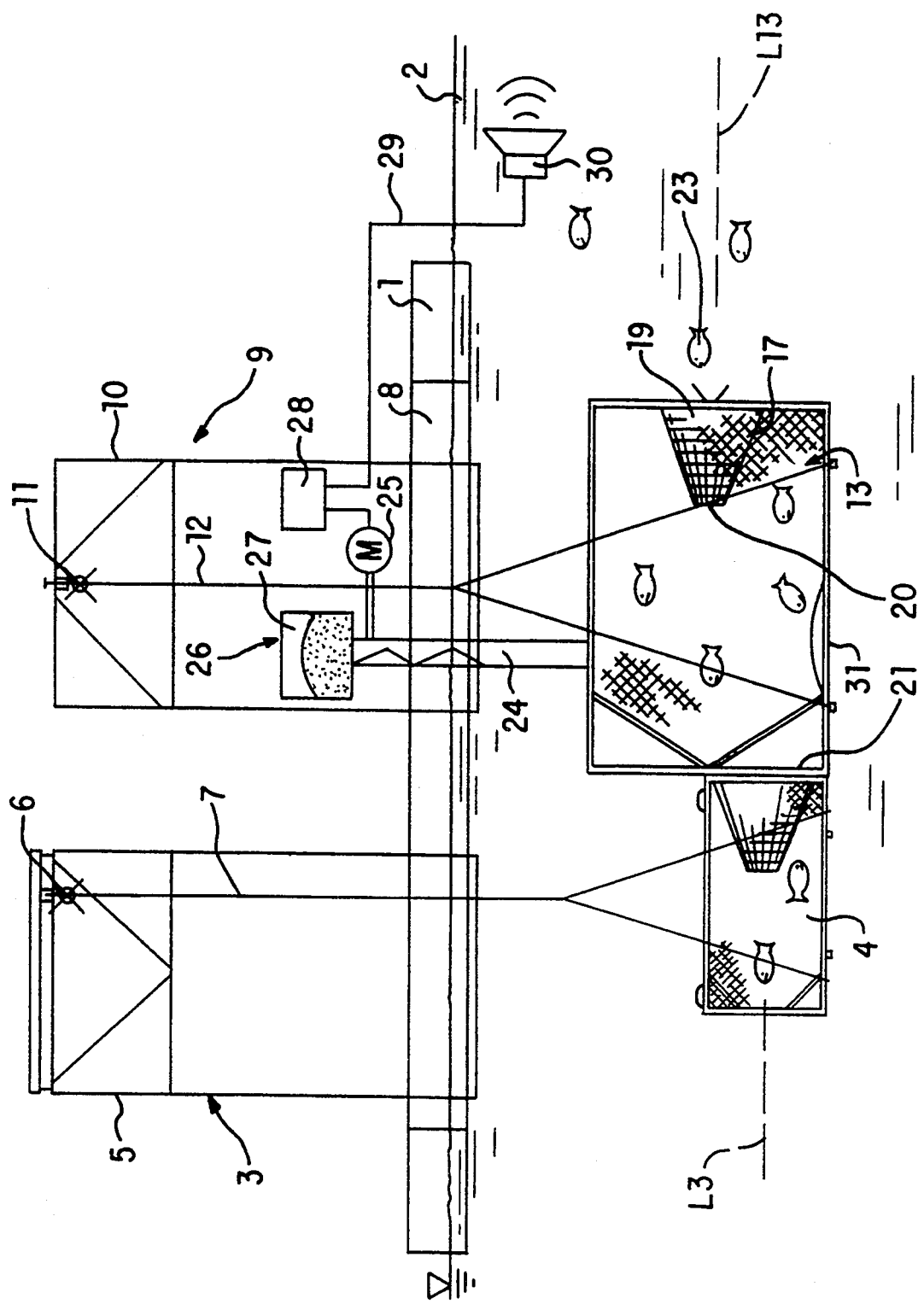
FIG. 2 is a representation similar to FIG. 1, in which the catch container is coupled to the food container.
Figure 4:
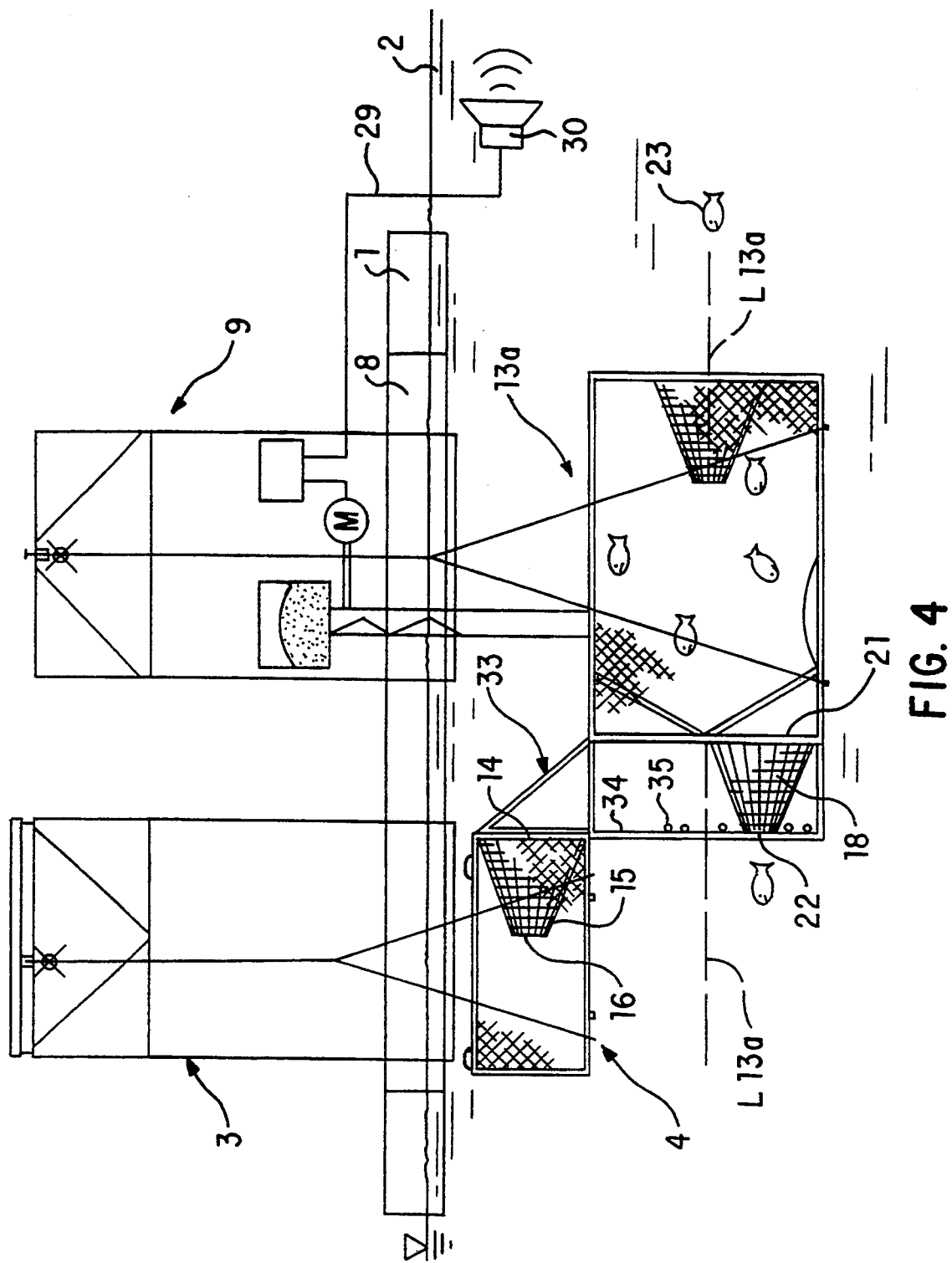
FIG. 4 is a simplified diagrammatic representation of another possible embodiment of the device according to the invention, including a food container and catch container lowered into the body of water, shortly before the final coupling of the catch container to the food container.

The device represented in FIG. 4 differs from the device of FIGS. 1-3 by utilizing a food container 13a, instead of the food container 13. The food container 13a comprises a frame part 33 on its front side provided with fish trap-like element 18, which is attached to this front side of the food container 13a and projects over this front side in the direction of longitudinal axis L13a. In a plane which runs perpendicular to axis L13a, frame part 33 forms a vertical guideway, provided with two vertical guide rails 34 placed parallel to one another. An opening 22 is provided in the plane of the guideway formed by guide rails 34. Catch container 4 is provided on its front side facing the fish trap-like element 15 with counterstays fitting into the guide rail 34.

During the fishing stage, the catch container 4 is initially lowered into the body of water 2 with its counterstays in the guide rails 34. Subsequently, the catch container 4 is then further lowered and slid into the guideway formed by guide rails 34, until the opening 14 is in the area of opening 22. To prevent fish 23 from being able to dodge sideways after swimming through opening 22, instead of swimming into the fish trap-like element 15, a grating 35 is provided on frame part 33 in the guide plane formed by the guide rails 34. Thus, the grating 35 would outwardly cover the part of the opening 14 lying outside of the opening 22 of element 18 and the opening 14 in the catch container 4 when it is coupled to food container 13a. The use of the fish trap-like element 15 with its large opening 14 also has the advantage, in this embodiment, that coupling the catch container 4 to the food container 13a, certain tolerances with respect to the positioning of catch container 4 are possible relative to the food container 13a.

In the above description, it was assumed that the catch container 4 and the food container 13,13a each consists of a frame made of a suitable material, for example, of a metal or steel frame, and the wall elements of the catch container 4 or of the food container 13,13a are made of a metal or wire grating.

Figure 5:
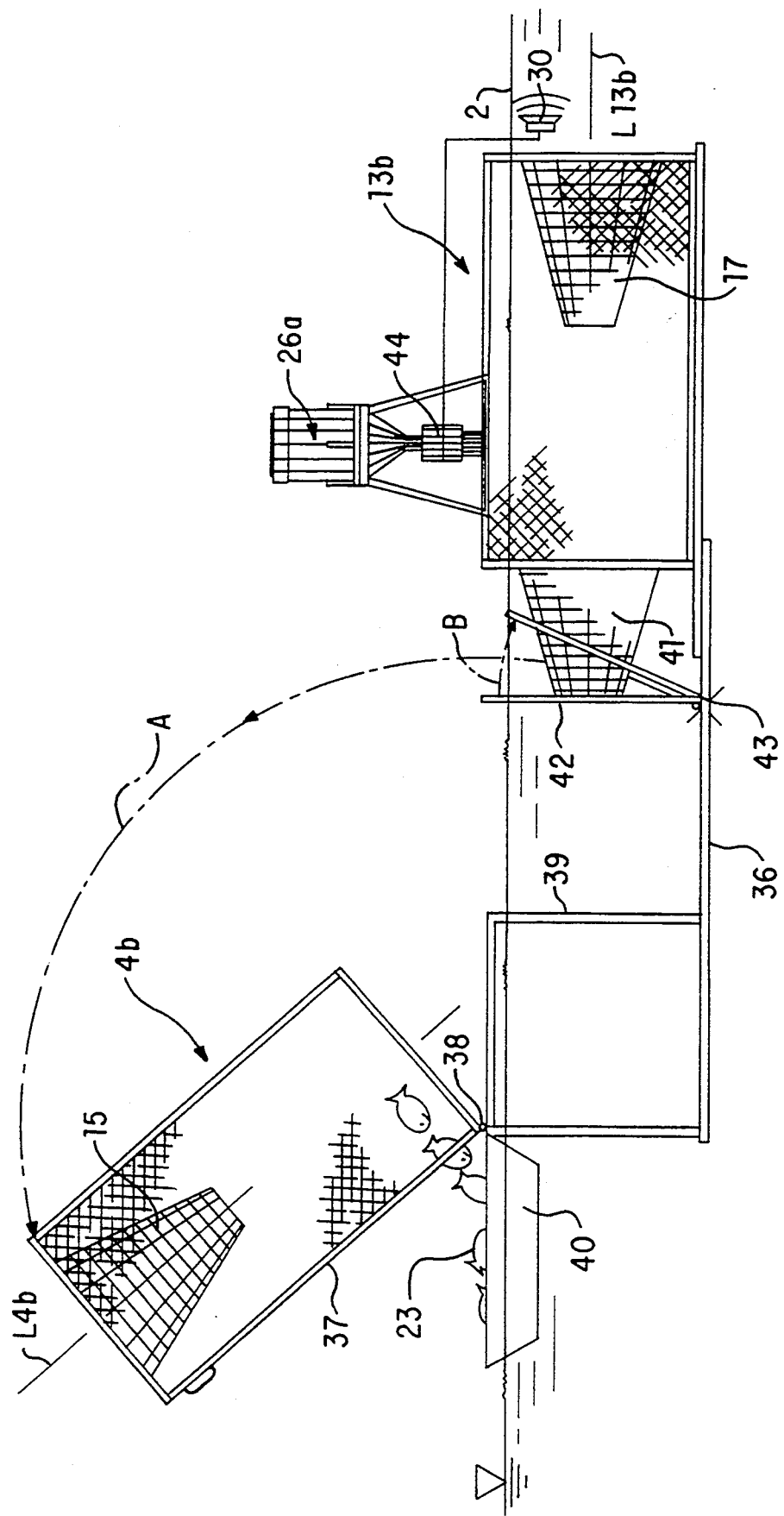
FIG. 5 is a simplified diagrammatic representation of a side view of another possible embodiment of the device according to the invention.
Figure 6B:
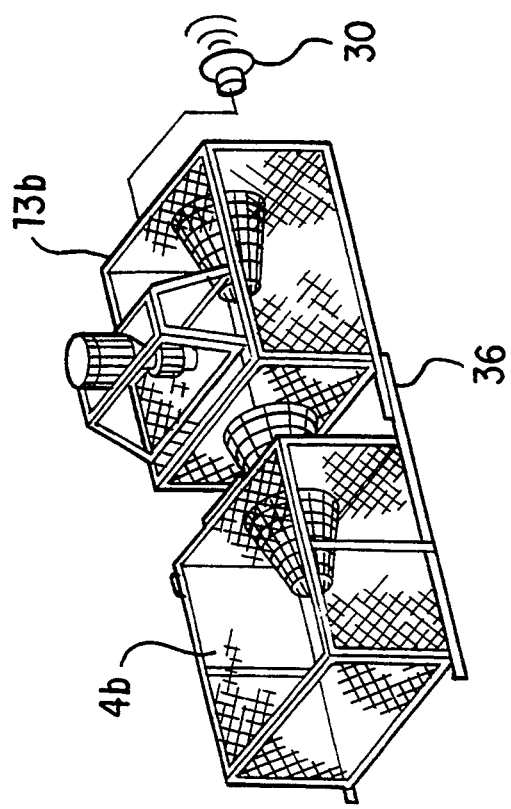
FIGS. 6a–6d are perspective representations of various positions of the device of FIG. 5.
Figure 6A:
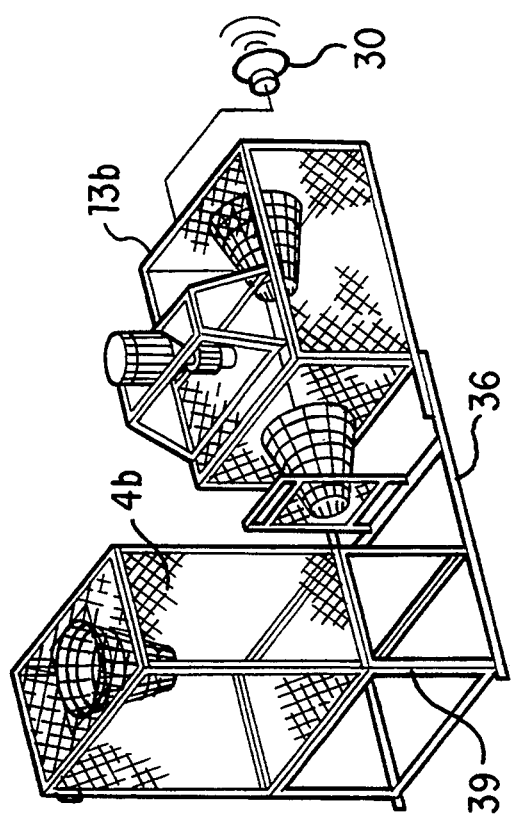
Figure 6C:
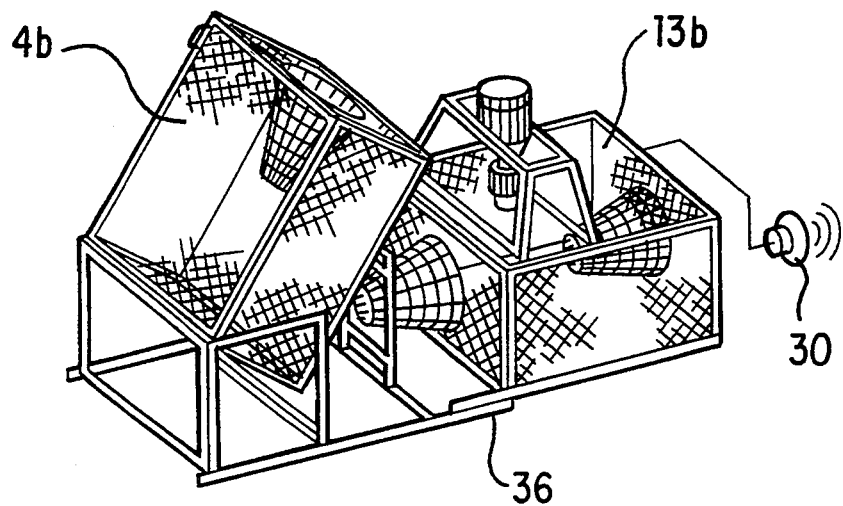
Figure 6D:
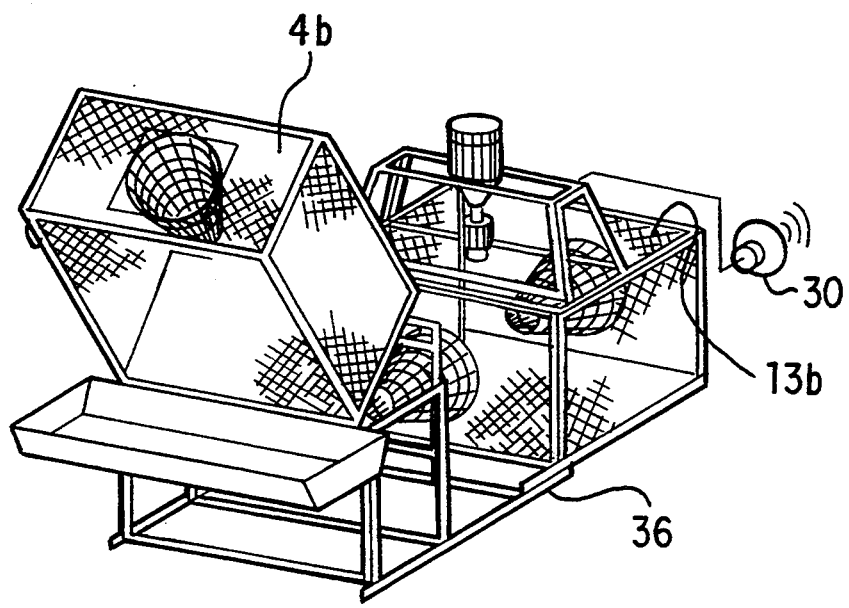

The device represented in FIGS. 5 and 6 differs from the device of FIGS. 1-3, by including a food container 13b and a catch container 4b instead of feeding container 13a,13b and catch container 4. The shape of the catch container 4b basically corresponds to that of catch container 4, and is provided with a fish trap-like element 15 as well as an opening provided in the container 4b. On its top side, the catch container 4 is provided with a removable cover 37. Alternatively, a slider can also be provided, instead of cover 37, which is movable between a position closing catch container 4b and an open position. Additionally, the catch container 4b is provided on a supporting frame 36.

On its front side facing away from element 15, specifically in the area of the transition or the edges between this front side and the top side comprising cover 37, catch container 4b is mounted to swing by a hinge 38 provided around a horizontal axis on a part 39 of the frame 36. The axis of the hinge 38 in this case runs perpendicular to the lengthwise extension L4b of the catch container 4b or of element 15. The pivoting angle of the hinge is greater than 90°, so that the catch container 4b can be tilted from a working or catch position, in which it is placed with its longitudinal axis L4b in the horizontal direction, to the tilted position, in which it is placed with its longitudinal axis L4b in the horizontal direction, to the tilted position represented in FIG. 5, in which the top side of catch container 4b provided with cover 37 points downward in order to empty fish 23 present therein into a receptacle or into a boat 40.

The food container 13b is also designed with a parallelepiped shape having a fish trap-like element 17 on one side allowing ingress of the fish and a fish trap-like element 41 formed opposite element 17 allowing egress of the fish. The function of element 41 corresponds to the function of element 18. However, element 41 is formed from a flexible grating or net.

The smaller opening of element 41 is attached to an auxiliary frame 42, which is provided to swing on frame 36 around a horizontal axis parallel to the axis of hinge 38, by action of a hinge 43. Hinge 43 is located below the longitudinal axis or the lengthwise extension of element 41, which coincides with longitudinal axis L13b of the food container 13b. When the catch container 4b is in the position shown in FIG. 6b, auxiliary frame 42, whose frame surface lies outside the opening of element 41, lies against the front surface of element 15 so that both elements 41 and 15 adjoin. The auxiliary frame 42 is locked onto the catch container 4b by a standard locking device (not shown in detail).

If the catch container 4b is to be swiveled from the working position corresponding to arrow A of FIG. 5, the auxiliary frame 42 must previous be swiveled to the side corresponding to arrow B.

An automatic feeding device 26a, corresponding to automatic feeding device 26, together with an electrical device 44, which is used to trigger the automatic feeding device, as well as signal transmitter 30, are also provided on food container 13b.

FIGS. 6a–6d illustrate the various positions of catch container 4b, specifically in a position for the conditioning or training or fish 23 (position a), in the catch or working position (position b) as well as in first and second removal positions (positions c and d). In positions a and d, catch container 4b is swung out completely from the water. In position c, the catch container 4b is still partially in the water, so that caught fish 23 can be received gently in catch container 4b and can be sorted, for example, by hand.

Figure 7:
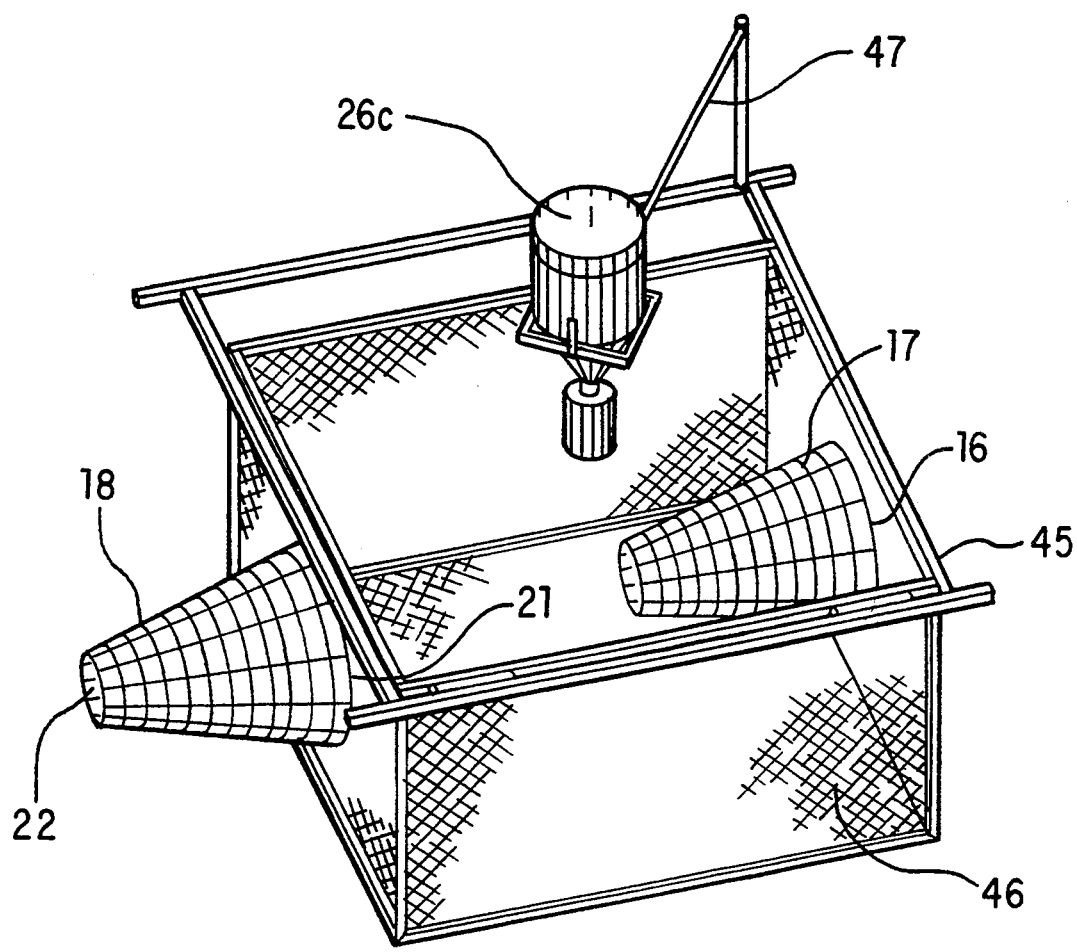
FIG. 7 is a perspective view of a further embodiment of the present invention.
Figure 8A:
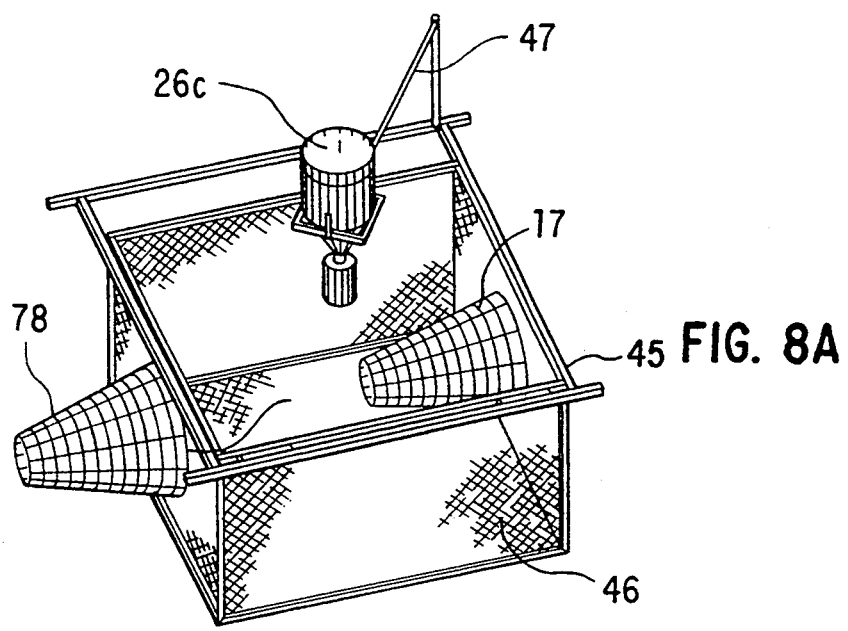
FIGS. 8a–8c are perspective representations of various positions of the device of FIG. 7.
Figure 8B:
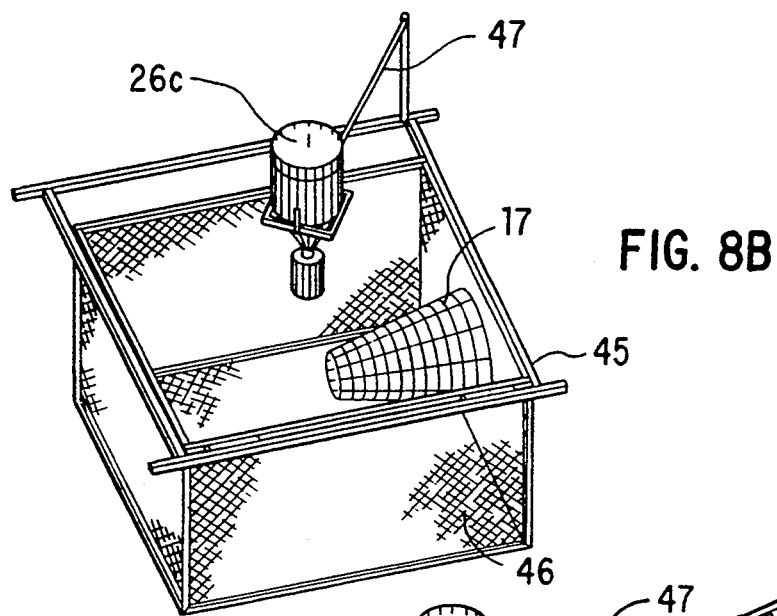
Figure 8C:
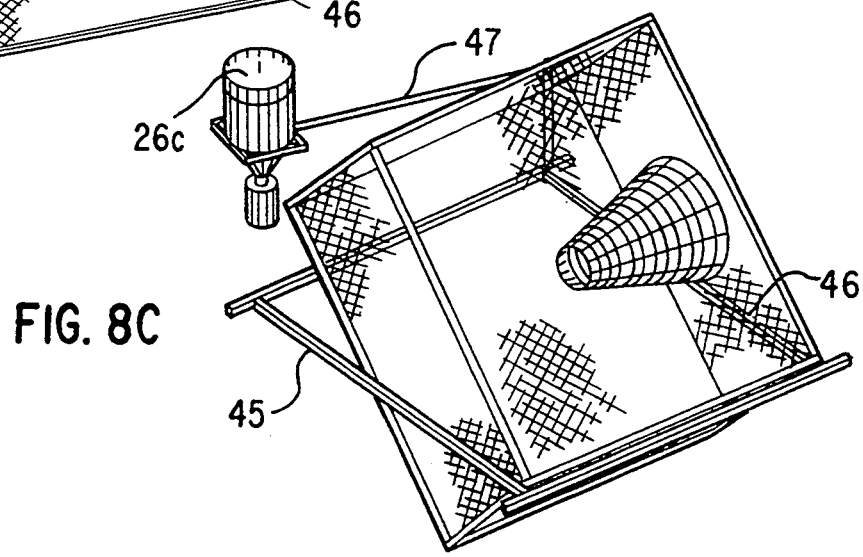

FIG. 7 shows, in perspective, another possible embodiment of the invention. In FIG. 8, this embodiment is represented in various positions a–c under various operating conditions.

The device represented in these figures consists of a frame 45, which is attached, for example, to platform 1, so that in the position which is represented in FIG. 7 as well as in positions a and b of FIG. 8, container 46 provided on frame 45 is immersed in the body of water. Container 46 is designed corresponding to container 13, i.e., it is made parallelepiped-shaped and has latticed or net-like wall elements. Opening 19 for the ingress of fish is made through the fish trap-like element 17 provided on one side of the container 46. Fish trap-like element 18 with two openings 21 and 22 is located on the side opposite from element 17. A swingable holder 47, to which an automatic feeding device 26c is attached, is provided on the frame 45.

As illustrated with respect to FIG. 7, as well as shown in positions a and b of FIG. 8, the automatic feeding device is located above container 46. In position c of FIG. 8, automatic feeding device 26c is swung to one side.

The mode of operation with the device according to FIGS. 7 and 8 can be described as follows:

The assumption is that container 46 is inserted into the body of water. The introduction of food or bait into container 40 is provided during an initial conditioning phase, as has been described with respect to food containers 13, 13a and 13b. During this conditioning or training phase, the fish can swim through container 46 in the preset direction through fish trap-like elements 17 and 18.

Following the conditioning or training phase, the container 46 is closed by closing the fish trap-like element at opening 21 or 22. Alternatively, the wall element, which comprises fish trap 18, can be replaced by a wall element without a fish trap. This condition is represented in position b of FIG. 8.

At the end of the fishing phase, after the swinging away of holder 47, container 46 in frame 45 is tilted, allowing easy removal of the caught fish after the container 46 is opened.

If the catch container 4b is to be swiveled from the working position corresponding to arrow A of FIG. 5, the auxiliary frame 42 must previously be swiveled to the side corresponding to arrow B.

An automatic feeding device 26a, corresponding to automatic feeding device 26, together with an electrical device 44, which is used to trigger the automatic feeding device, as well as signal transmitter 30, are also provided on food container 13b.

This invention was explained by means of the embodiments illustrated with respect to the figures. It is understood that numerous changes as well as modifications are possible, without thus deviating from the basic ideas of the invention.

Thus, it is possible, for example, to produce catch container 4,4b as well as food container 13,13a,13b or their wall elements also from another material such as a fine grating produced from iron or steel rods, or a net made of a suitable material, e.g., plastic and/or natural fiber or a plastic grating. The walls of the catch container 4,4b and/or of the food container 13,13a,13b can also be produced completely or partially from a transparent material, e.g., made of glass panes or of panes made of acrylic glass, and the design is matched to the type of fish mainly to be caught in each case. In a device for catching eels, solid wall elements can also be used.

Instead of acoustic signal transmitter 30 immersed in the body of water 2, other acoustic signal transmitters can also be used, as for example, devices which produce an acoustic signal in the body of water 2 through platform 1. Thus, it is possible that the acoustic signal produced from an operating device of automatic feeding device 26 possibly is already sufficient. Instead of an acoustic signal transmitter or in addition to it, other signal transmitters can also be provided, as for example, optical signal transmitters or else devices which produce a certain movement in the water. The type of signal transmitter or transmitters used in each case again depends basically on the type of fish 23 to be caught.

Of course, it is also possible to provide the device of the present invention on the shore or pier, or other non-floating structure.

For monitoring and optimization, and underwater video camera can also be provided on the food container, so that the type of fish swimming in and out of the food container can then be monitored.

For repair and cleaning purposes, as well as for a positional change of the device at the end of the fishing season, food container 13,13a is lifted with the help of lifting device 9 or lifted out from the body of water 2. Furthermore, it is also possible by lifting device 9 to position food container 13,13a in the body of water 2 at a depth which is optimally matched to the fish 23 to be caught, i.e., at a depth at which the largest yield of the fish to be caught is to be expected.

In the embodiment according to FIG. 4, it can also be suitable to design the frame part 33 so that it projects from the surface of the body of water to facilitate the mounting of the catch container 4 in the guide rails 34. But in this case, the catch container 4 would also remain constantly connected with the food container 13a.

I claim:

1. A process for catching fish including the steps of:
   introducing a substantially enclosed food container into a body of water provided with fish, said food container provided with a first opening for the ingress of fish and a second opening for the egress of fish;

training the fish to enter said first opening and exit said second opening by producing a signal in the body of water for a period of time and dispensing food into said food container during the time said signal is produced, wherein said signal is discontinued after the completion of said period of time;

repeating said training step a plurality of times;

lowering a substantially enclosed catch container having an access opening into the body of water;

aligning said access opening of said catch container with said second opening of said food container;

producing the signal in the body of water and dispensing food into said food container in a manner substantially similar to that of said training steps, such that fish will enter said food container through said first opening and move to said catch container through said second opening of said food container and said access opening of said catch container;

removing said catch container containing fish from the body of water; and emptying the fish from said catch container.

2. The process of catching fish in accordance with claim 1 wherein said signal is produced for a predetermined period of time and said training step is repeated on a periodic basis.

3. The process of catching fish in accordance with claim 2 wherein said signal is acoustic in nature.

4. The process of catching fish in accordance with claim 3, wherein said acoustic signal is initiated prior to dispensing food to said food container.

5. The process of catching fish in accordance with claim 3, wherein said acoustic signal is initiated contemporaneously with the dispensing of food to said food container.

6. The process of catching fish in accordance with claim 2 wherein said signal is optical in nature.

7. An apparatus for catching fish from a body of water comprising:

a support surface;

a substantially enclosed food container having at least two sides provided with a first opening for the ingress of fish and a second opening for the egress of fish, said food container provided in the body of water;

a substantially enclosed catch container having at least one side, said side provided with an access opening, said catch container provided with a first fish-trap element aligned with said access opening, said fish-trap element provided with a first end connected to said side of said catch container, said first end having an opening of a first diameter, said fish-trap element provided with a second end opposite to said first end, said second end having an opening of a second diameter less than said first diameter, said first fish-trap element provided in the interior of said catch container;

a means for dispensing food into said food container; and a first transporting means provided on said support surface for lowering said catch container from said support surface into the body of water such that said second opening of said food container is aligned with said access opening of said catch container, said transporting means also used to raise said catch container from the body of water to said support surface.

8. The apparatus in accordance with claim 7, further including a second transporting means provided on said support surface used to lower said food container into the body of water and to raise said food container from the body of water to said platform.

9. The apparatus in accordance with claim 7 further provided with a support frame connected to said catch container and said fish container, and a hinge connected to said support frame and said catch container, to allow said catch container to rotate with respect to said support frame.

10. The apparatus in accordance with claim 7, further including a means provided on said support surface for producing a signal in the body of water.

11. The apparatus in accordance with claim 7, wherein said food container is provided with second and third fish-trap elements, said second fish-trap element aligned with said first opening of said food container, said second fish-trap element having a first end having an opening of a first diameter connected to one side of said food container, and having a second end opposite to said first end of said second fish-trap element, said second end having an opening of a second diameter less than said first diameter, said third fish-trap element aligned with said second opening of said food container, said third fish trap element having a first end having an opening of a first diameter connected to a second side of said food container, and having a second end opposite to said first end of said third fish-trap element, said second end of said third fish-trap element having an opening of a second diameter less than said first diameter of said third fish-trap element.

12. The apparatus in accordance with claim 11, wherein said second fish-trap element is provided in the interior of said food container.

13. The apparatus in accordance with claim 12, wherein said third fish-trap element projects into the body of water.

14. The apparatus in accordance with claim 11, wherein said first, second and third fish-trap elements are frustum-shaped.

15. The apparatus in accordance with claim 14, wherein each of the frustums is provided with wall sections at least partially provided with transparent material.

16. The apparatus in accordance with claim 7, wherein said means for dispensing food is operated automatically and includes a channel of changeable length.

17. The apparatus in accordance with claim 10, wherein said signal means generates an acoustic signal.

18. The apparatus in accordance with claim 10, wherein said signal means generates an optical signal.

19. The apparatus in accordance with claim 10, wherein means for dispensing food dispenses food during a period of time when a signal is produced by said signal means.

20. The apparatus in accordance with claim 10, wherein said signal means produces a signal prior to the time food is dispensed by said dispensing means into said food container, said signal means also producing a signal when food is being dispensed by said dispensing means.

21. The apparatus in accordance with claim 7, wherein a means is provided for coupling said catch container to said food container.

22. The apparatus in accordance with claim 21 wherein said coupling means includes a guideway and a counterstay connected to said catch container.

23. The apparatus in accordance with claim 22, wherein said guideway is vertical.

24. The apparatus in accordance with claim 21, wherein said coupling means includes a swingable auxiliary frame connected to said food container.

25. The apparatus in accordance with claim 7, wherein said catch container is provided with a removable top.

26. The apparatus in accordance with claim 7, wherein said means for dispensing food is movable.

27. The apparatus in accordance with claim 7 wherein said support surface is a platform floating on top of the body of water.

* * * * *